United States Patent
Vitt et al.

(10) Patent No.: US 11,227,623 B1
(45) Date of Patent: Jan. 18, 2022

(54) ADJUSTING AUDIO TRANSPARENCY BASED ON CONTENT

(71) Applicant: Apple Inc., Cupertino, CA (US)

(72) Inventors: Nikolas T. Vitt, Sunnyvale, CA (US); Christopher T. Eubank, Mountain View, CA (US); Jonathan D. Sheaffer, San Jose, CA (US); Tomlinson Holman, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/868,360

(22) Filed: May 6, 2020

Related U.S. Application Data

(60) Provisional application No. 62/851,935, filed on May 23, 2019.

(51) Int. Cl.
| | |
|---|---|
| *G10L 25/51* | (2013.01) |
| *G10L 15/00* | (2013.01) |
| *H04R 3/04* | (2006.01) |
| *H04R 3/00* | (2006.01) |
| *H04R 5/04* | (2006.01) |
| *H04R 5/033* | (2006.01) |
| *H04R 5/027* | (2006.01) |
| *G06F 3/01* | (2006.01) |
| *H04R 3/12* | (2006.01) |

(52) U.S. Cl.
CPC ............ *G10L 25/51* (2013.01); *G06F 3/017* (2013.01); *G10L 15/00* (2013.01); *H04R 3/005* (2013.01); *H04R 3/04* (2013.01); *H04R 3/12* (2013.01); *H04R 5/027* (2013.01); *H04R 5/033* (2013.01); *H04R 5/04* (2013.01); *H04R 2430/01* (2013.01)

(58) Field of Classification Search
CPC ......... G10L 25/51; G10L 25/75; G10L 15/00; H04R 5/04; H04R 5/033; H04R 3/04; H04R 3/12; H04R 5/027; H04R 3/005; H04R 1/1016; H04R 1/1083; H04R 1/406; H04R 11/02; H04R 2430/01; H04R 2420/03; H04R 2460/11; H04R 1/1075; G06F 3/017; G10K 11/1782; G10K 11/17837; G10K 11/17881; G10K 11/17885; G10K 2210/1081

See application file for complete search history.

(56) References Cited

U.S. PATENT DOCUMENTS

| | | | |
|---|---|---|---|
| 2016/0351183 A1 | 12/2016 | Gauger, Jr. et al. | |
| 2017/0086008 A1 | 3/2017 | Robinson | |
| 2017/0208382 A1* | 7/2017 | Grinker | H04R 1/1041 |
| 2017/0245044 A1 | 8/2017 | Cartwright et al. | |

OTHER PUBLICATIONS

Wagenaars, W. M., et al., "Subjective Evaluation of Dynamic Compression in Music", J. Audio Eng Soc., vol. 34, No. 1/2, Jan./Feb. 1986, 9 pages.

* cited by examiner

*Primary Examiner* — Yogeshkumar Patel
(74) *Attorney, Agent, or Firm* — Womble Bond Dickinson (US) LLP

(57) ABSTRACT

Audio processing with audio transparency can include receiving a user content audio signal and receiving a microphone signal. The microphone signal can contain sensed sound of a user environment. Strength of the sensed sound can be increased based on strength of the user content audio signal, to reduce a masking of the sensed sound during playback. The sensed sound and the user content audio signal can be combined in a composite output audio signal used to drive a speaker. Other aspects are also described and claimed.

21 Claims, 6 Drawing Sheets

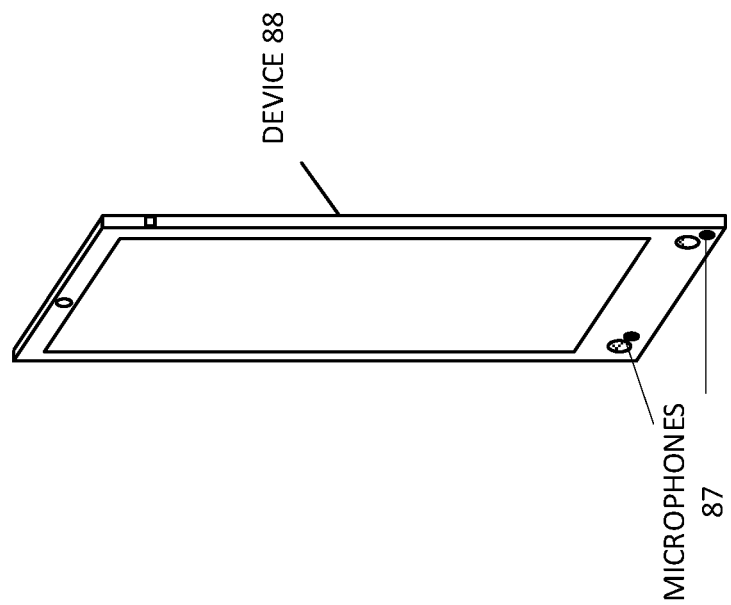
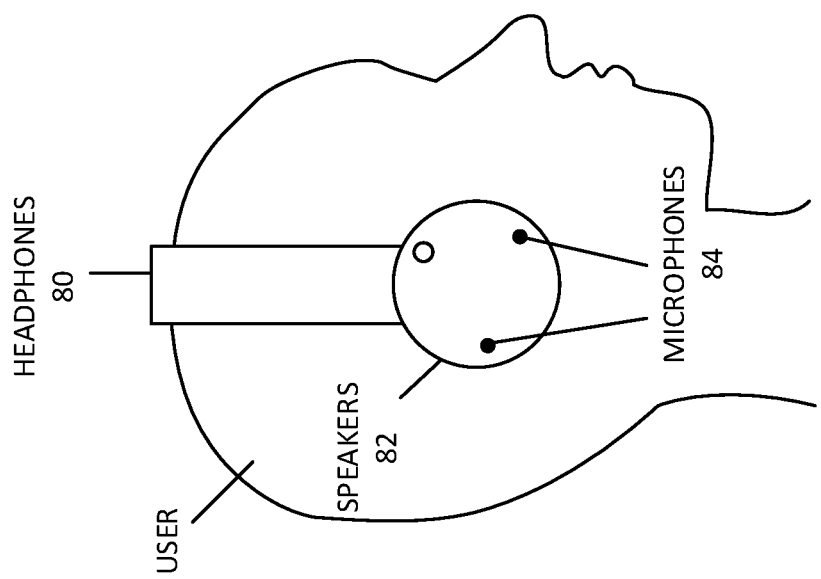
FIG. 4

ADJUSTING AUDIO TRANSPARENCY BASED ON CONTENT

CROSS-REFERENCE TO RELATED APPLICATION

This application claims priority to U.S. Provisional Patent Application No. 62/851,935 filed May 23, 2019.

FIELD

One aspect of the disclosure herein relates to audio processing with audio transparency.

BACKGROUND

Headphones can prevent or obstruct the ability to hear outside sounds. Some headphones have microphones that capture outside sound and play the outside sound back to the user in real-time. This feature is known as audio 'transparency' or 'passthrough'.

SUMMARY

Headphones, such as over-ear, on-ear, or in-ear, can prevent or obstruct the ability of a wearer to hear sounds originating in user's environment. In addition, when audio content is played too loud, this too can block outside sounds when content is played too loud.

Microphones, which can be arranged on headphones and sense outside sound. The respective microphone signals can thus contain information that represents outside sound (e.g. sounds in a user's environment). In some cases, the outside sound, should be playbed back, but may not be audible because the user content masks the outside sound, even when the outside sound is reproduced via the headphone speakers (e.g., as audio transparency). Headphones can allow a user to specify an outside sound playback strength (e.g., playback level) with a user control (e.g., a slider or knob), but the loudness or strength of the user content may vary from one moment to another. For example, if a user is watching a movie with audio playback through headphones, the audio signal may have much higher levels or strength during an action sequence as compared to during a tranquil sequence. Thus, a user may have to continuously adjust the strength of outside sound playback to hear outside sounds.

In one aspect, a method for audio processing with audio transparency includes: receiving a user content audio signal; receiving a microphone signal containing sensed sound of a user environment (e.g., outside sound); increasing strength of the sensed sound based on strength of the user content audio signal, to reduce or prevent a masking of the sensed sound during playback; and combining, in an output audio signal, a) the sensed sound, with b) the user content audio signal, wherein the output audio signal (having the composite audio content) is used to drive a speaker. The outside sound can, in such a manner, be dynamically adjusted (e.g., boosting) based on the user content so that during periods of high strength levels of user content, strength of the playback of sensed sound (e.g., audio transparency) is increased while during periods of low strength levels, strength of the sensed sound is adjusted with lower playback strength. A user would no longer have to manually adjust the strength of the audio transparency.

In one aspect, a method for audio processing with spatial audio transparency, includes: receiving a user content audio signal; receiving, from a plurality of microphones forming a microphone array, a plurality of corresponding microphone signals containing a sensed sound (e.g., outside sound in the user's environment); estimating a physical location of the sensed sound; assigning a virtual location to the sensed sound based on the estimated physical location, and if the virtual location is within a threshold proximity to one or more virtual locations of user content sounds in the user content audio signal, then modifying the virtual location of the sensed sound; combining, the sensed sound with the user content audio signal, resulting in a modified user content having the sensed sound; and spatially rendering the modified user content in a plurality of output audio channels, wherein the output audio channels are used to drive a plurality of speakers. Relocating the virtual location in a way that separates the outside sound from spatialized user content can increase intelligibility of the user content and the sensed sound and reduce or prevent masking of the user content and/or the sensed sound.

In one aspect, a method for audio processing with audio transparency, includes: receiving a user content audio signal; extracting, from a microphone signal, a user voice and ambient sound in a user environment; increasing strength of the user voice based on strength of the user content or strength of the ambient sound in the user environment; combining, in an output audio signal, the user voice and the ambient sound with the audio signal containing the user content, wherein the output audio signal is used to drive a speaker. Separately extracting a user voice and ambient sound from the microphone signal allows for boosting of the user voice over the ambient sound and/or reduction of the ambient sound relative to the user voice. 'Ambient sound' here can be any outside sound that is not the user's voice. By boosting the perceived volume of the user's voice during playback, the system can indirectly control the user's speech loudness.

For example, where a room full of users are present (or virtually combined in a teleconference), the cumulative voice of users and ambient sounds can cause each user to increase the level of their own voice (i.e. talk louder) in a feedback loop that could eventually increase the overall volume of the environment to a point where everyone is yelling. Thus, by boosting the perceived volume of the user's own voice during playback, the method can indirectly control (e.g., maintain or reduce) the loudness at which a user speaks, which in turn, can further indirectly control the loudness at which other users speak.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

FIG. 4 illustrates an example of audio system hardware.

DETAILED DESCRIPTION

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

Audio Transparency Boosting

Figure 1:
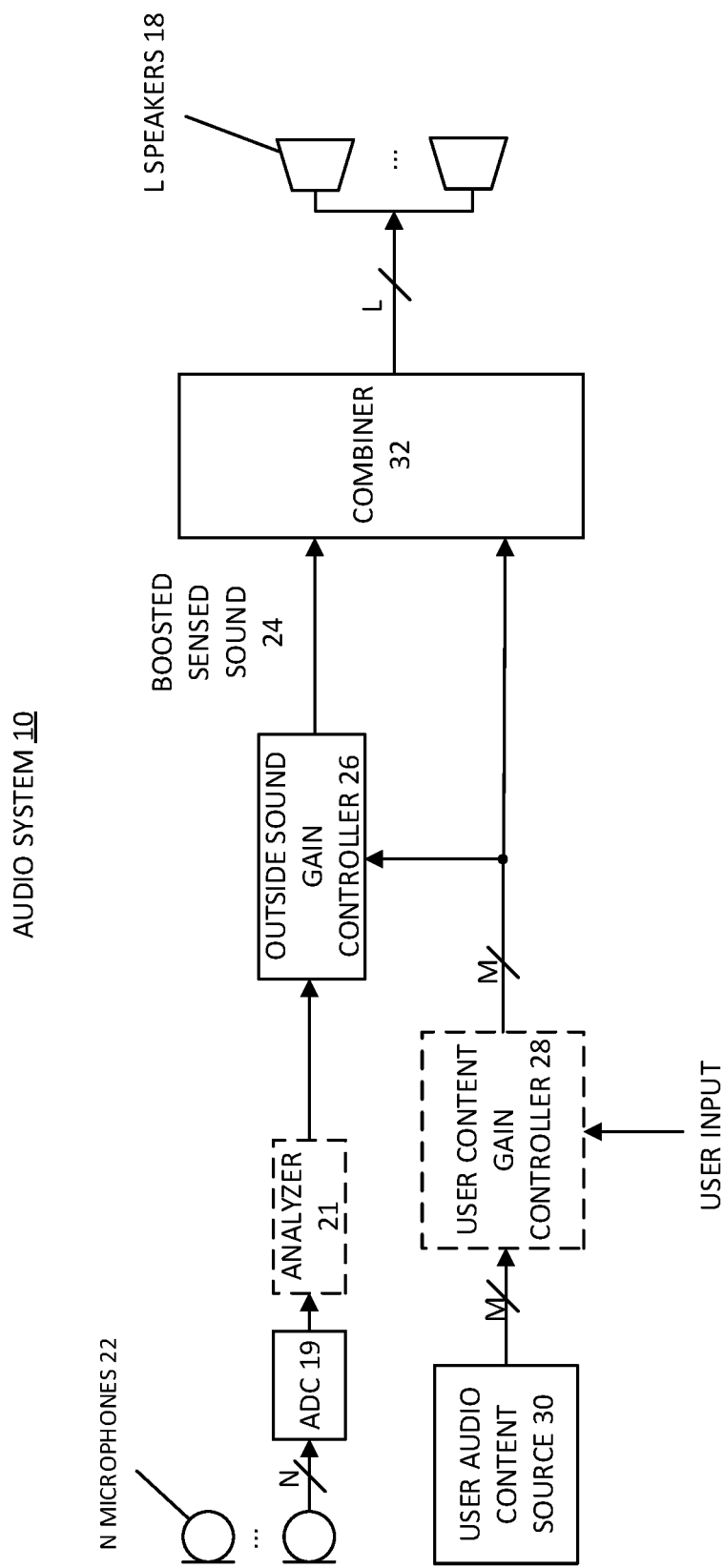
FIG. 1 illustrates an audio system with audio transparency, according to one aspect.

Referring now to FIG. 1, an audio system (or device) 10 is shown for processing sound with audio transparency, in one aspect. The system can include headphones (e.g., in-ear, over-ear, or on-ear), a laptop computer, a desktop computer, a mobile phone, a smart phone, a tablet computer, a smart speaker, or an infotainment system for an automobile or other vehicle, or combinations thereof. It should be understood that mention of headphones should include any head-worn device having one or more speakers.

Figure 2:
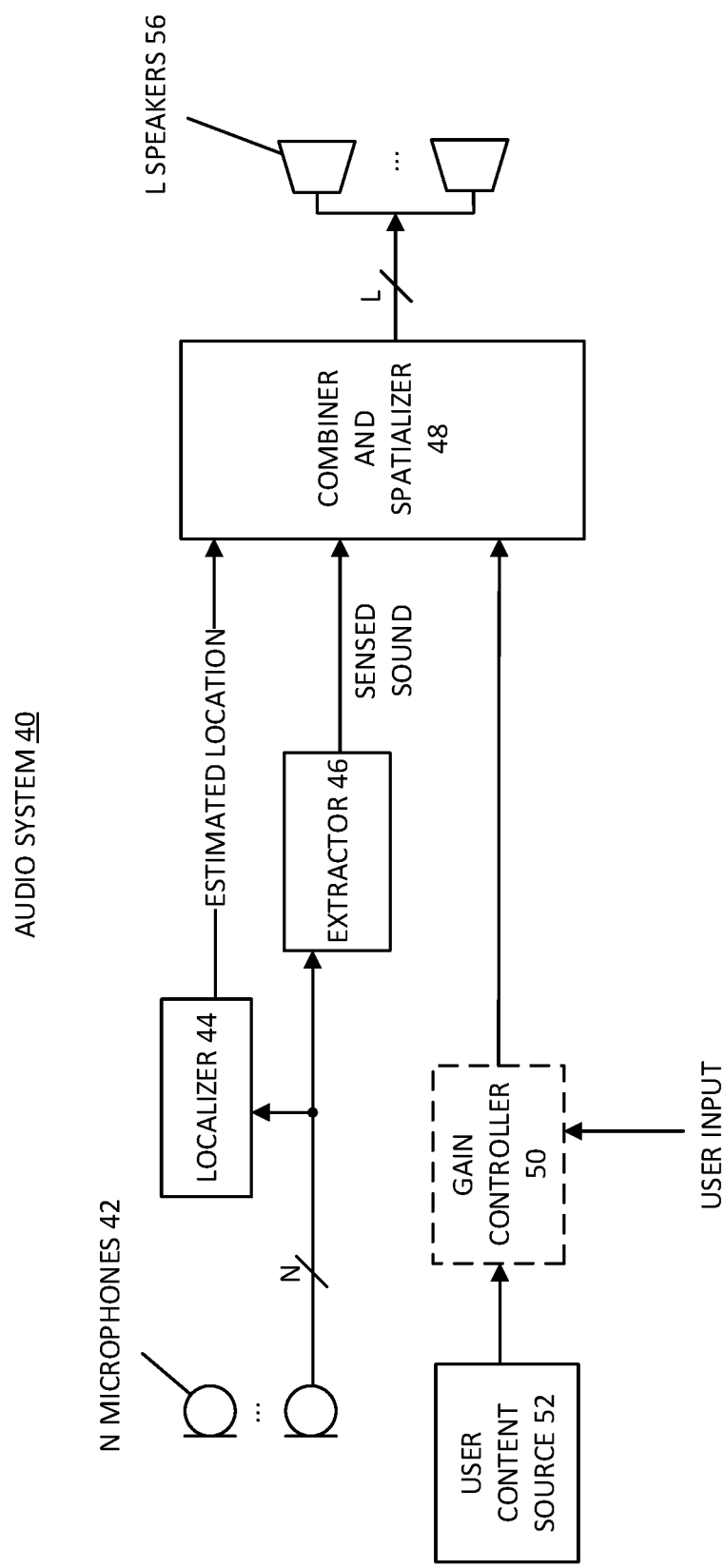
FIG. 2 illustrates an audio system with spatial audio transparency, according to one aspect.
Figure 3:
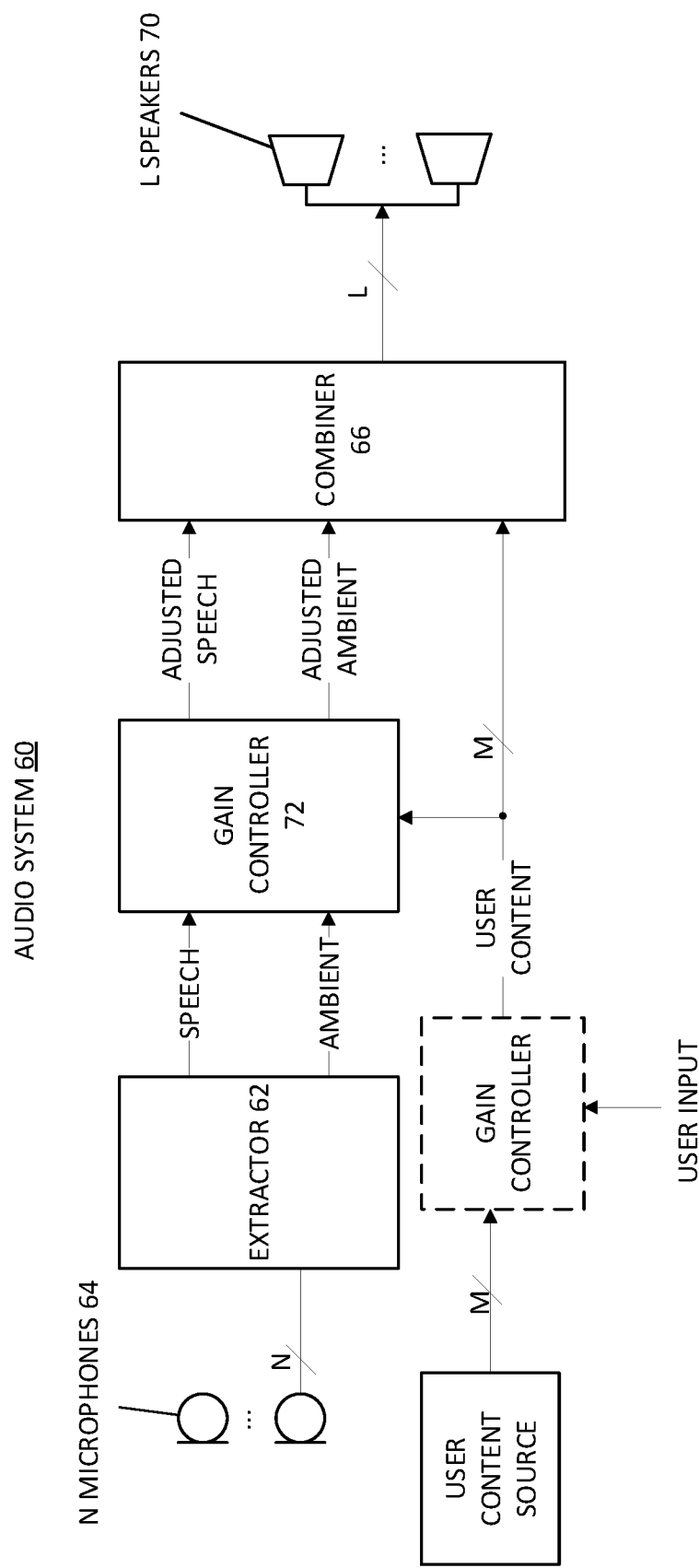
FIG. 3 illustrates an audio system with audio transparency with separated speech and ambient sound, according to one aspect.

N microphones 22 of the system can sense sound in a user environment (e.g., outside sound) and generate N microphone signals having data representing sensed sound. Sensed sound can include, for example, a user's voice, other voices, birds chirping, doors closing, wind, a television, etc. The microphone signals can be analog signals that are converted to digital signals by an analog to digital converter 19. The microphone signals can optionally be converted, by an analyzer 21, from time domain to frequency domain, for example, through a short time Fourier transform (STFT) or other known analyzing techniques, resulting in a sequence of frequency domain frames where each frame contains frequency bands of a time window. It should be understood that, although not shown, FIGS. 2 and 3 can also include ADC and analyzer modules, as shown and arranged in FIG. 1. The combiners 32 (or 48 and 66 of FIGS. 2 and 3) can convert the signals back to time domain.

A user audio content source 30 can provide a user content audio signal to the system. The source can be a content server, a computing device, etc. The content can be provided via wires, and/or through wireless transmission. In one aspect, the user content audio signal can be formed from a sequence of audio frames. The audio frame can contain loudness or strength information, for example, in metadata, on a frame by frame basis. In the case that the user content audio signal does not contain such metadata, the strength can be calculated, by measuring the strength of the signal in a time window (e.g., an average). Instantaneous strengths can also be used; however, this can cause unwanted jitter of the transparency and also be an inefficient user of processing resources. The user content audio signal can be digital or analog.

Additionally or alternatively the user content can be stored in internal memory of the system. User content audio signals can contain an audio track for a movie or video, a song, an audio book, or other audio work. The user content audio signal or signals can have different formats, for example, 5.1 surround sound, 7.1 surround sound, two-channel stereo, etc. The user audio content channels can be upmixed or downmixed with known techniques at the combiner 32 or elsewhere in the system or by the audio content source, this not being germane to the present disclosure. In one aspect, a user can optionally control a playback strength of the user content through a user content gain controller 28.

An outside sound gain controller 26 can increase a strength 24 of the sensed sound based on strength of the user content audio signal. By increasing the playback strength of the transparency relative to the user content audio signal, masking of the sensed sound can be reduced or prevented.

In one aspect, increasing the strength of the sensed sound includes comparing the strength of the user content audio signal to strength of the sensed sound to determine a strength ratio and increasing the strength of the sensed sound so that the determined strength ratio does not exceed a masking threshold. The masking threshold can be a predetermined threshold stored in a lookup table or other memory structure in computer-readable memory. In one aspect, increasing the strength of the sensed sound includes comparing strength of one or more frequency bands of the user content audio signal to strength of corresponding frequency bands of the sensed sound and increasing strength of one or more of the one or more frequency bands of the sensed sound based on the comparison. In one aspect, different frequency bands can have corresponding masking thresholds. A masking threshold can be predetermined based on routine tests and/or knowledge or data regarding how humans perceive sounds.

In one aspect, the strengths of the user content audio signal and the microphone signals can be a measure of a) loudness, K-weighted, relative to full scale (LKFS), b) sound pressure level, c) decibel, d) an estimated playback volume or level, etc. In one aspect, the strength of the user content audio signal is an average strength calculated over a time period (for example, an average over one or more audio frames, a moving average of overlapping or non-overlapping time windows, etc.). A time period can be 150 ms, 300 ms, 450 ms, or other length of time, capable of being determined through routine test. In one aspect, increasing of the strength of the sensed sound, relative to previous playback strength of the sensed sound, is limited at a ramping threshold to avoid a sudden increase of the playback strength of the sensed sound. The averaging of the user content audio signal strength and limiting the increasing and/or decreasing of the playback strength can reduce undesirable fluctuations of the audio transparency playback.

In one aspect, the audio system can be headphones (e.g., in-ear, over-ear, or on-ear headphones) and the speaker is arranged on the headphones (e.g., externally arranged) to capture outside sound of the wearer. The wearer can hear outside sounds through the amplified audio transparency.

In one aspect, the sensed sound is recognized in the microphone signal as a new sound that was not previously present in the microphone signal. For example, the analyzer 21 can include a machine learning module (e.g., one or more trained neural networks) that can recognize when a new sound is present. Alternatively or additionally, the analyzer can compare audio signatures currently present in the microphone signal with audio signatures previously present in the microphone signal to detect if a new audio signature is present. For example, if there the sound of a fan is constantly present, but then a door slams in the user's environment, the door slam (the 'sensed sound' in this scenario) can be combined into the user content and reproduced by the headphone speakers, while the sound of the fan is ignored. The strength of the door slam can be increased if masked by the user content, as described in other sections. In another example, the constant sound of rain or an air conditioner can be ignored but the sound of a dog barking or a baby's crying can be detected as new sounds and reproduced through the headphone speakers.

In one aspect, the analyzer 21 can include an automatic speech recognition (ASR) module. The sensed sound that is boosted can be speech, recognized in the microphone signal with a speech recognition algorithm by the automatic speech recognition module. The ASR can utilize trained neural networks to detect speech in the microphone signals and recognize a user's speech from other speech. For example, in the case of headphones, the ASR can recognize speech from the user wearing the headphones by learning the speech signature of the user and using the signature to later recognize the same user's speech in the microphone signal.

In one aspect, the sensed sound includes all outside sound sensed by the microphone in the user environment. All sounds sensed by the microphone could be boosted in the audio transparency, based on the strength of the user content audio signal. The user can be comforted by having awareness of the user's surroundings through being able to hear all outside sounds through the audio transparency.

In one aspect, the strength of the user content audio signal is not modified when combined in the output audio signal for playback. Thus, the user content will play back at the level specified by a default strength or as modified by a user input through the user content gain controller 28 (e.g., with a volume knob). The user content gain controller will automatically increase (and/or decrease) the sensed sound based on the strength of the user content audio signal. Thus, if a user increases a playback volume of the user content, the sensed sound will automatically be louder, but the user content will remain as specified by the user.

The combiner 32 can combine the boosted sensed sound 24 with the one or more user content audio signals in L output audio signals. The system can drive L speakers 18 with the L output audio signals to play back the user content with the sensed sound (e.g., audio transparency) to the listener.

Figure 5:
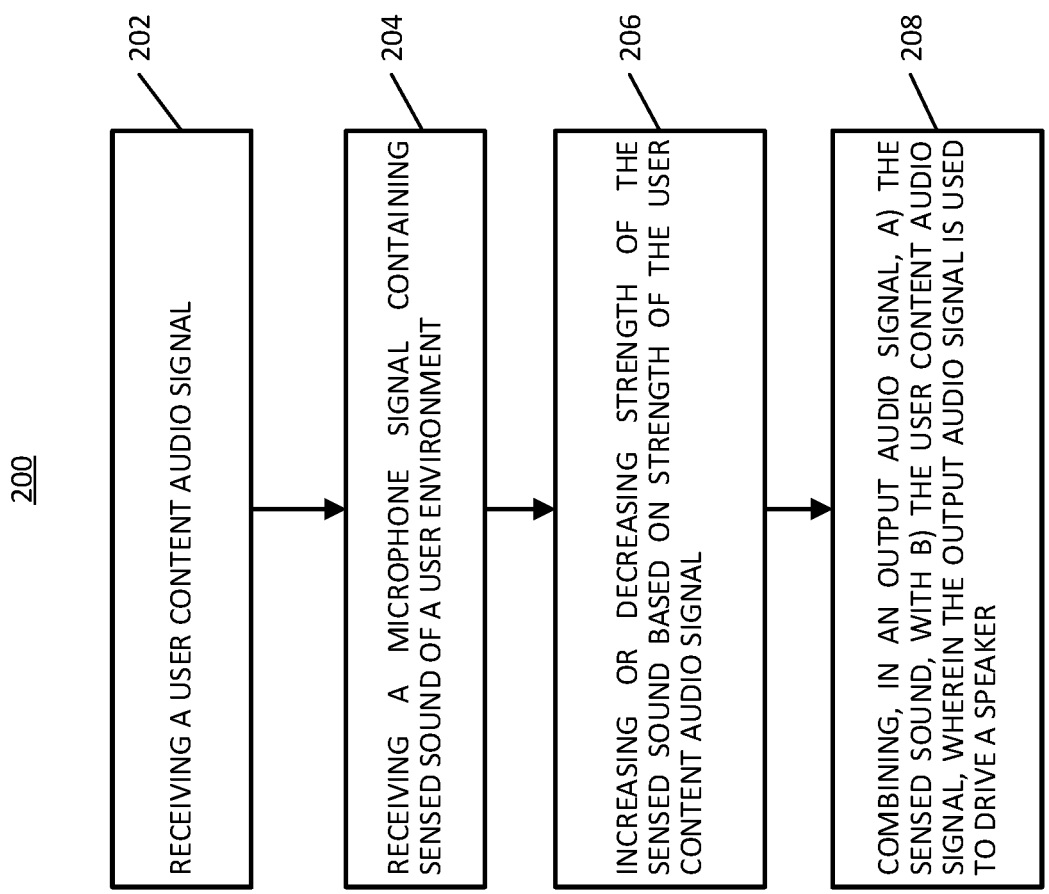
FIG. 5 an audio system process with audio transparency, in one aspect.

In one aspect, a method or process 200 is shown in FIG. 5 for audio processing with audio transparency. The process includes: at block 202, receiving a user content audio signal; at block 204, receiving a microphone signal containing sensed sound of a user environment; at block 206, increasing or decreasing strength of the sensed sound based on strength of the user content audio signal; and at block 208, combining, in an output audio signal, a) the sensed sound, with b) the user content audio signal, wherein the output audio signal is used to drive a speaker.

At block 206, the strength of the sensed sound can be increased to reduce masking of the sensed sound by the user content. In one aspect, the process is repeated periodically. Strength (e.g., an average strength) can be repeatedly calculated over a plurality of time periods. The strength of the sensed sound is repeatedly increased, or not increased, based on a time varying strength of the user content audio signal. It should be understood that if a sensed sound is increased and subsequently, not increased, then then strength of the sensed sound can decrease relative to the previous playback strength of the sensed sound. In other words, the strength of the audio transparency will decrease back to the original strength of the sensed sound in the microphone signals when the boosting is no longer required.

Spatial Audio Transparency

In one aspect, an audio system 40 can provide audio processing with spatial audio transparency. A plurality of N microphones 42 forming one or more microphone arrays can sense sound (e.g., speech of a user, speech of a bystander, a door slamming, etc.,) in a user's environment.

Microphone signals of the N microphones are processed by a localizer 44 to estimate a physical location of the sensed sound (e.g., relative to the microphone array). The physical location can be estimated based on time difference of arrival (TDOA) of the sensed sound, triangulation, steered beamforming, or other localization techniques. In one aspect, estimating the physical location of the sensed sound includes determining an angle of arrival of the sensed sound based on the microphone signals of the microphone array, and estimating the physical location of the sensed sound based on the angle of arrival of the sensed sound. For example, steered beamforming can include a) feeding microphone signals received from the microphone array to a set of beamformers pointing in a discrete number of directions in the user area, b) calculating an energy output from each beamformer of the set of beamformers, c) determining an angle of arrival of the sensed sound based on a beamformer with a largest energy output, and d) estimating the current location (e.g., the angle of arrival and/or the distance) of the sensed sound based on the angle of arrival of the sensed sound.

Based on the estimated physical location of the sensed sound, the combiner and spatializer 48 can assign a virtual location to the sensed sound. The assigned virtual location can be similar or corresponding to the physical location of the sensed sound. In one aspect, if the virtual location is within a threshold proximity to one or more virtual locations of user content sounds in the user content audio signal, then the localizer can modifying the virtual location of the sensed sound to create a virtual distance between the user content sounds and the sensed sound during playback. Metadata of the user content audio signal can include spatial information (e.g., virtual locations) of the user content sounds that can be processed in the above process. Adjustment of the virtual location of the sensed sound can increase intelligibility and reduce masking of the user content sounds and/or the sensed sound.

An extractor 46 can extract the sensed sound from the microphone signals (e.g., through filtering or other techniques) so that the sensed sound can be combined with the user content. The threshold proximity can, in one aspect, be one or more predefined proximities. In one aspect, the threshold can vary based on the strength of the sensed sound and the user content. For example, if the strength of the sensed sound and/or the user content is high, then the threshold proximity may increase in distance to further space apart the virtual sound objects. If one or both of the strengths are low, then the threshold can be smaller. The one or more thresholds can be stored in memory, such as in a look up table or other known data structures.

A combiner and spatializer 48 can combine, the sensed sound with the user content audio signal, resulting in a modified user content having the sensed sound, and spatially render the modified user content in a plurality of output audio channels. The L output audio channels are used to drive a plurality of speakers 56. Similar to FIG. 1, a user content source 52 can provide a user content audio signal that can optionally be modified by a gain controller 50. The user content audio signal can have spatial information for sounds in the user content. In one aspect, the spatial information is contained in metadata of the user content audio signal. The spatial information can be encoded in metadata and transmitted to the headphone set alongside a plurality of audio streams corresponding to the metadata (e.g., Dolby ATMOS), or the audio could be spatially encoded in a form such as High Order Ambisonics (HOA). The combiner and spatializer can spatially render the modified user content, including convolving the modified user content with an impulse response (e.g., a head related impulse response (HRIR) or a binaural room impulse response (BRIR) in the case of a headphone set).

In one aspect, the system can include a headphone set, where microphones 42 can be arranged on a headphone set to pick up outside sound and speakers 56 are arranged on the headphone set to play sound to the user's ears through over-ear, on-ear, or in-ear speakers.

In addition, the system (e.g., the combiner and spatializer) can also modify (e.g., increase and/or decrease) the strength of the sensed sound based on the strength of the user content audio signal, as described in reference to FIGS. 1 and 5. Thus, the system can reduce masking of the audio transparency by adjusting a virtual position of the sensed sound and/or by increasing the strength of the sensed sound.

Audio Processing with Audio Transparency and Separation of Ambient and Speech

In one aspect, a system is shown for audio processing with audio transparency with separation of speech and ambience. The system includes an extractor 62 that receives a microphone signal and extracts from the signal, two audio components: a) speech of a user and b) ambient sound. 'Ambient sound' here can be understood to include sounds in the user's physical environment other than the speech of the user, picked up by one or more microphones 64. In one aspect, a Modified Perceptual Wiener Filter (MPWF) can be used to separately extract the speech and ambient sound from the microphone signal. Additionally or alternatively, an adaptive beamforming method and algorithm can be used to process microphone signals from a microphone array to separately extract the speech and ambient sound. A spatial beam can be focused in a target direction and adapt (e.g., dynamically) in order to maximize or minimize a desired parameter, such as Signal-to-interference-plus-noise ratio or signal to noise ration (SNR). Other adaptive beamforming techniques can include least means square (LMS) error and/or sample matrix inversion (SMI) algorithm.

The gain controller 72 can increase strength of the user speech based on strength of the user content and/or strength of the ambient sound in the user environment. The combiner 66 can combine, in an output audio signal, the user voice and the ambient sound with the audio signal containing the user content, wherein the output audio signal is used to drive a speaker. It is understood that, when a user cannot hear their own voice (usually due to loud sounds in the user's environment), the user will speak louder. In the case where multiple people share an environment, this effect can feedback unto itself and cause everyone to speak louder to the point where nobody can hear themselves. Boosting the playback of the user speech can help prevent or reduce this and also help a user control their voice in public. For example, a user can lose awareness of her voice loudness because they do not hear their own voice, especially when the user is wearing a headphone set or a headphone set with display (e.g., a head-mounted display). If the system (e.g., a headphone set or HMD) boosts the user's speech relative to the user content and/or the ambient sound, the system can indirectly control the user's speech.

In one aspect, the gain controller can additionally or alternatively reduce strength of the ambient sound, thereby reducing any masking of the user's speech by the ambient sound in the user's environment, when played back as audio transparency.

In one aspect increasing the strength of the user voice includes comparing the strength of the user voice with the strength of the ambient sound and/or the strength of the user content to determine a strength ratio, and increasing the strength of the user voice such that the strength ratio does not exceed a predefined threshold. The threshold can be stored in memory, such as in a look up table or other data structure. The threshold can be determined based on how humans raise their voices relative to how they hear their own voice. The threshold can also be frequency dependent, for example, different frequencies of the user voice can be compared to corresponding frequencies of the ambient sound and/or user content with different thresholds for each frequency band, as described in reference to FIG. 1. Other aspects of FIGS. 1, 2, and 3 apply to each other, as should be understood by one skilled in the art, such as continuous processing of the user content and microphone signals in real-time as described in reference to FIG. 1. Similarly, the boosting feature of FIG. 1 can apply to FIG. 2, and the spatializing feature of FIG. 2 can apply to FIGS. 1 and 3.

In one aspect, the user content includes a voice or ambient sound from a second user, and the system communicates information from the microphone signal to the second user (e.g., the speech and/or ambient sound of the first user). Thus, the system can facilitate teleconferencing with two or more users and indirectly control the loudness of each user's voice, by boosting speech playback of a user to the user.

A simulated reality environment can include spatialized sound and, optionally, a visual component with virtual content rendered with images that depict the physical environment.

As shown in FIG. 4, the system can include a headphone set 60 having speakers 82 (e.g., a left and right speaker) and one or more microphones 84 arranged on the headphone set to capture outside sounds. In one aspect, a device 66 can provide a user content audio signal to the headphone set. In one aspect, the device can have microphones 63 that capture outside sounds used for transparency. Although device 66 is shown as a tablet computer, it can also be a smart speaker, a content server, a laptop or desktop computer, a media console, or other computing device that communicates with the headphone set. The headphone set can also be a HMD or other audio playing device.

Figure 6:
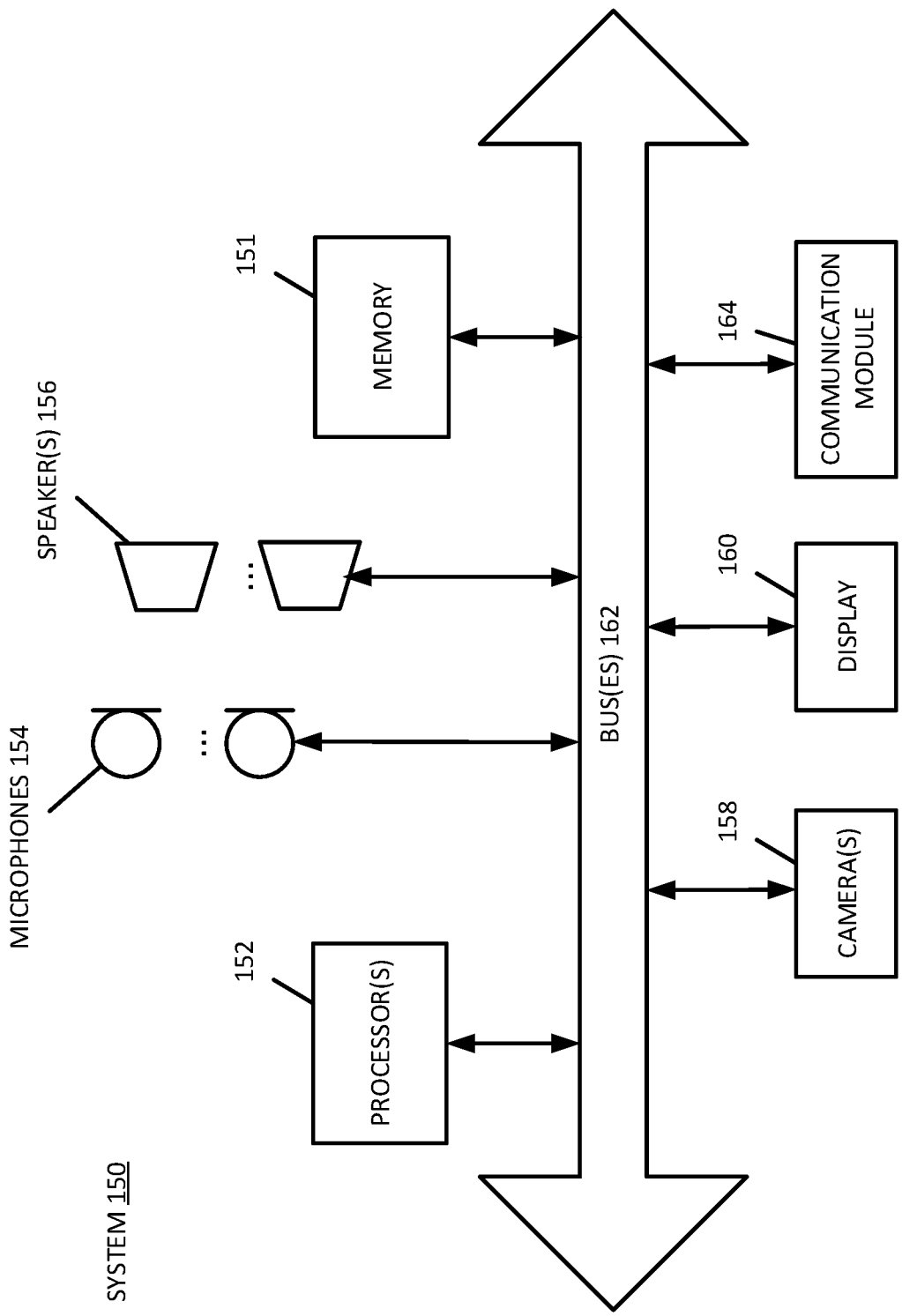
FIG. 6 illustrates an example of audio system hardware.

FIG. 6 shows a block diagram of audio processing system hardware, in one aspect, which may be used with any of the aspects described herein. This audio processing system can represent a general purpose computer system or a special purpose computer system. Note that while FIG. 6 illustrates the various components of an audio processing system that may be incorporated into headphones, speaker systems, microphone arrays and entertainment systems, it is merely one example of a particular implementation and is merely to illustrate the types of components that may be present in the audio processing system. FIG. 6 is not intended to represent any particular architecture or manner of interconnecting the components as such details are not germane to the aspects herein. It will also be appreciated that other types of audio processing systems that have fewer components than shown or more components than shown in FIG. 6 can also be used. Accordingly, the processes described herein are not limited to use with the hardware and software of FIG. 6.

As shown in FIG. 6, the audio processing system 150 (for example, a laptop computer, a desktop computer, a mobile phone, a smart phone, a tablet computer, a smart speaker, a head mounted display (HMD), a headphone set, or an infotainment system for an automobile or other vehicle) includes one or more buses 162 that serve to interconnect the various components of the system. One or more processors 152 are coupled to bus 162 as is known in the art. The processor(s) may be microprocessors or special purpose processors, system on chip (SOC), a central processing unit, a graphics processing unit, a processor created through an Application Specific Integrated Circuit (ASIC), or combinations thereof. Memory 151 can include Read Only Memory (ROM), volatile memory, and non-volatile memory, or combinations thereof, coupled to the bus using techniques known in the art.

Memory, although not shown in FIG. 6, can be connected to the bus and can include DRAM, a hard disk drive or a flash memory or a magnetic optical drive or magnetic memory or an optical drive or other types of memory systems that maintain data even after power is removed from the system. In one aspect, the processor 152 retrieves computer program instructions stored in a machine readable storage medium (memory) and executes those instructions to perform operations described herein.

Audio hardware, although not shown, can be coupled to the one or more buses 162 in order to receive audio signals to be processed and output by speakers 156. Audio hardware can include digital to analog and/or analog to digital converters. Audio hardware can also include audio amplifiers and filters. The audio hardware can also interface with microphones 154 (e.g., microphone arrays) to receive audio signals (whether analog or digital), digitize them if necessary, and communicate the signals to the bus 162.

Communication module 164 can communicate with remote devices and networks. For example, communication module 164 can communicate over known technologies such as Wi-Fi, 3G, 4G, 5G, Bluetooth, ZigBee, or other equivalent technologies. The communication module can include wired or wireless transmitters and receivers that can communicate (e.g., receive and transmit data) with networked devices such as servers (e.g., the cloud) and/or other devices such as remote speakers and remote microphones. The system can include, in one aspect, one or more cameras 158 and/or display 160 (e.g., in a HMD).

It will be appreciated that the aspects disclosed herein can utilize memory that is remote from the system, such as a network storage device which is coupled to the audio processing system through a network interface such as a modem or Ethernet interface. The buses 162 can be connected to each other through various bridges, controllers and/or adapters as is well known in the art. In one aspect, one or more network device(s) can be coupled to the bus 162. The network device(s) can be wired network devices (e.g., Ethernet) or wireless network devices (e.g., WI-FI, Bluetooth). In some aspects, various aspects described (e.g., simulation, analysis, estimation, modeling, object detection, etc.,) can be performed by a networked server in communication with the capture device.

Various aspects described herein may be embodied, at least in part, in software. That is, the techniques may be carried out in an audio processing system in response to its processor executing a sequence of instructions contained in a storage medium, such as a non-transitory machine-readable storage medium (e.g. DRAM or flash memory). In various aspects, hardwired circuitry may be used in combination with software instructions to implement the techniques described herein. Thus the techniques are not limited to any specific combination of hardware circuitry and software, or to any particular source for the instructions executed by the audio processing system.

In the description, certain terminology is used to describe features of various aspects. For example, in certain situations, the terms "analyzer", "separator", "renderer", "estimator", "combiner", "synthesizer", "controller", "localizer", "spatializer", "component," "unit," "module," and "logic", "extractor", "subtractor", "generator", "optimizer", "processor", and "simulator" are representative of hardware and/or software configured to perform one or more processes or functions. For instance, examples of "hardware" include, but are not limited or restricted to an integrated circuit such as a processor (e.g., a digital signal processor, microprocessor, application specific integrated circuit, a micro-controller, etc.). Thus, different combinations of hardware and/or software can be implemented to perform the processes or functions described by the above terms, as understood by one skilled in the art. Of course, the hardware may be alternatively implemented as a finite state machine or even combinatorial logic. An example of "software" includes executable code in the form of an application, an applet, a routine or even a series of instructions. As mentioned above, the software may be stored in any type of machine-readable medium.

Some portions of the preceding detailed descriptions have been presented in terms of algorithms and symbolic representations of operations on data bits within a computer memory. These algorithmic descriptions and representations are the ways used by those skilled in the audio processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined or removed, performed in parallel or in serial, as necessary, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as, special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination hardware devices and software components.

While certain aspects have been described and shown in the accompanying drawings, it is to be understood that such aspects are merely illustrative of and not restrictive on the broad invention, and the invention is not limited to the specific constructions and arrangements shown and described, since various other modifications may occur to those of ordinary skill in the art. The description is thus to be regarded as illustrative instead of limiting.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method for audio processing with audio transparency, comprising:
   receiving a user content audio signal;
   receiving a microphone signal comprising sensed sound of a user environment;
   increasing strength of the sensed sound based on strength of the user content audio signal to reduce a masking of the sensed sound during playback, wherein the increasing comprises comparing strength of one or more frequency bands of the user content audio signal to strength of corresponding frequency bands of the sensed sound, or comparing the strength of the user content audio signal to strength of the sensed sound to determine a strength ratio; and
   combining, in an output audio signal, a) the sensed sound, with b) the user content audio signal,
   wherein the output audio signal is used to drive a speaker.

2. The method of claim 1, wherein increasing the strength of the sensed sound includes
   increasing the strength of the sensed sound so that the determined strength ratio does not exceed a masking threshold.

3. The method of claim 1, wherein increasing the strength of the sensed sound includes
   increasing strength of one or more of the one or more frequency bands of the sensed sound based on the comparison.

4. The method of claim 1, wherein the strength of the user content audio signal is a measure of loudness, K-weighted, relative to full scale (LKFS).

5. The method as in claim 1, wherein the strength of the user content audio signal is an average strength calculated over a time period.

6. The method of claim 5, wherein the method is repeated periodically such that the average strength is repeatedly calculated over a plurality of time periods and the strength of the sensed sound is repeatedly increased or not increased, based on a time varying strength of the user content audio signal.

7. The method of claim 6, wherein the method is performed concurrent with receiving the user content audio signal and the microphone signal in real-time.

8. The method of claim 1, wherein increasing of the strength of the sensed sound, relative to previous playback strength of the sensed sound, is limited at a ramping threshold to avoid a sudden increase of the playback strength.

9. The method of claim 1, wherein the speaker is arranged on headphones.

10. The method of claim 1, wherein the sensed sound is recognized in the microphone signal as a new sound that was not previously present in the microphone signal.

11. The method of claim 1, wherein the sensed sound is speech, recognized in the microphone signal with a speech recognition algorithm.

12. The method of claim 11, wherein the speaker is disposed in headphones and the speech is of a user wearing the headphones.

13. The method of claim 1, wherein the sensed sound includes all outside sound sensed by the microphone in the user environment.

14. The method of claim 1, wherein the strength of the user content audio signal is not modified when combined in the output audio signal for playback.

15. A method for audio processing with spatial audio transparency, comprising:
   receiving a user content audio signal;
   receiving, from a plurality of microphones forming a microphone array, a plurality of corresponding microphone signals containing a sensed sound;
   estimating a physical location of the sensed sound;
   assigning a virtual location to the sensed sound based on the estimated physical location, and
   if the virtual location is within a threshold proximity to one or more virtual locations of user content sounds in the user content audio signal,
   then modifying the virtual location of the sensed sound;
   combining, the sensed sound with the user content audio signal, resulting in a modified user content having the sensed sound; and
   spatially rendering the modified user content in a plurality of output audio channels, wherein the output audio channels are used to drive a plurality of speakers.

16. The method of claim 15, wherein estimating the physical location of the sensed sound includes
   determining an angle of arrival of the sensed sound based on the microphone signals of the microphone array; and
   estimating the physical location of the sensed sound based on the angle of arrival of the sensed sound.

17. The method of claim 15, further comprising modifying strength of the sensed sound based on strength of the user content audio signal.

18. The method of claim 15, wherein
   the plurality of speakers are arranged on a headphone set worn over, on, or in a user's ears,
   the microphone array is arranged on the headphone set, and
   spatially rendering the modified user content includes convolving the modified user content with a binaural room impulse response.

19. A method for audio processing with audio transparency, comprising:
   receiving a user content audio signal;
   extracting, from a microphone signal, a user speech and ambient sound in a user environment;
   increasing strength of the user speech based on strength of the user content or strength of the ambient sound in the user environment, wherein the increasing comprises comparing the strength of the user speech with the strength of the ambient sound or the strength of the user content to determine a strength ratio; and combining, in an output audio signal, the user speech and the ambient sound with the audio signal containing the user content, wherein the output audio signal is used to drive a speaker.

20. The method of claim 19, wherein increasing the strength of the user voice includes increasing the strength of the user speech such that the strength ratio does not exceed a predefined threshold.

21. The method of claim 20, wherein the user content includes a speech or ambient sound from a second user, and the method further comprises communicating information from the microphone signal to the second user.

\* \* \* \* \*